United States Patent
Dobson et al.

(10) Patent No.: US 7,631,968 B1
(45) Date of Patent: Dec. 15, 2009

(54) CELL PHONE DISPLAY THAT CLIPS ONTO EYEGLASSES

(75) Inventors: Dominic Dobson, Mercer Island, WA (US); Peter K. Purdy, Bend, OR (US)

(73) Assignee: Motion Research Technologies, Inc., Seattle, WA (US)

( * ) Notice: Subject to any disclaimer, the term of this patent is extended or adjusted under 35 U.S.C. 154(b) by 228 days.

(21) Appl. No.: 11/555,317

(22) Filed: Nov. 1, 2006

(51) Int. Cl.
*G02C 1/00* (2006.01)

(52) U.S. Cl. .......................................... 351/158; 345/8
(58) Field of Classification Search ................... 351/41, 351/158; 345/7, 8
See application file for complete search history.

(56) References Cited

U.S. PATENT DOCUMENTS

| | | | | |
|---|---|---|---|---|
| 5,162,828 | A | 11/1992 | Furness et al. | 353/122 |
| 6,034,653 | A * | 3/2000 | Robertson et al. | 345/8 |
| 6,091,832 | A | 7/2000 | Shurman et al. | 381/381 |
| 6,160,666 | A | 12/2000 | Rallison et al. | 359/630 |
| 6,349,001 | B1 | 2/2002 | Spitzer | 359/618 |
| 6,769,767 | B2 | 8/2004 | Swab et al. | 351/158 |
| 7,158,096 | B1 * | 1/2007 | Spitzer | 345/8 |
| 2006/0119540 | A1 | 6/2006 | Dobson et al. | 345/8 |
| 2006/0250574 | A1 | 11/2006 | Grand et al. | 351/158 |

* cited by examiner

*Primary Examiner*—Hung X Dang
(74) *Attorney, Agent, or Firm*—Christopher P. Maiorana, PC

(57) ABSTRACT

An apparatus generally including a first housing and a second housing is disclosed. The first housing may have (i) one or more first clips configured to removably secure the first housing to a frame of eyeglasses, (ii) at least one sensor configured to sense a response of a user wearing the eyeglasses and (iii) a transceiver configured to (a) receive an image in a receive message from external of the apparatus and (b) transmit the response in a transmit message to external of the apparatus. The second housing may be (i) attached to the first housing, (ii) positionable before a lens opening of the eyeglasses on a side of the lens opening opposite the user and (iii) configured to display the image to the user through the lens opening.

22 Claims, 12 Drawing Sheets

CELL PHONE DISPLAY THAT CLIPS ONTO EYEGLASSES

CROSS REFERENCE TO RELATED APPLICATIONS

The present application is related to co-pending U.S. patent application Ser. No. 11/233,163, filed Sep. 22, 2005 is still pending and Ser. No. 11/522,860 filed Sep. 18, 2006, now abandoned which are hereby incorporated by reference in their entirety.

FIELD OF THE INVENTION

The present invention relates to a method and/or architecture for wearable human interfaces generally and, more particularly, to a cell phone display that clips onto eyeglasses.

BACKGROUND OF THE INVENTION

The expanded use of cellular telephones has made it more likely that a person will answer a call. Unfortunately, a likelihood that the call will disrupt the person at an inopportune moment has also increased. For example, the cellular telephones are very mobile and thus the person being called could be driving an automobile, a motorcycle or a bicycle when the call is placed. To answer the call, the person will remove a hand from the steering wheel/handle bar to reach the telephone. If the telephone has caller identification, the person will look away from the road to see who is calling. Answering the call can distract the person from the task of driving thereby creating a potentially dangerous situation.

SUMMARY OF THE INVENTION

The present invention concerns an apparatus generally comprising a first housing and a second housing. The first housing may have (i) one or more first clips configured to removably secure the first housing to a frame of eyeglasses, (ii) at least one sensor configured to sense a response of a user wearing the eyeglasses and (iii) a transceiver configured to (a) receive an image in a receive message from external of the apparatus and (b) transmit the response in a transmit message to external of the apparatus. The second housing may be (i) attached to the first housing, (ii) positionable before a lens opening of the eyeglasses on a side of the lens opening opposite the user and (iii) configured to display the image to the user through the lens opening.

The objects, features and advantages of the present invention include providing a cell phone display that clips onto eyeglasses that may (i) provide an image to a user received from one or more remote devices, (ii) provide an audible sound to the user from the remote devices, (iii) provide haptic notifications to the user from the remote devices (iv) provide a bone conducted sound between the user and the remote devices, (v) enable a hands-free response to remote telephone devices, (vi) enable hands-free commands to the remote devices, and/or (vii) display information from one or more sources embedded in the eyeglasses to the user.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
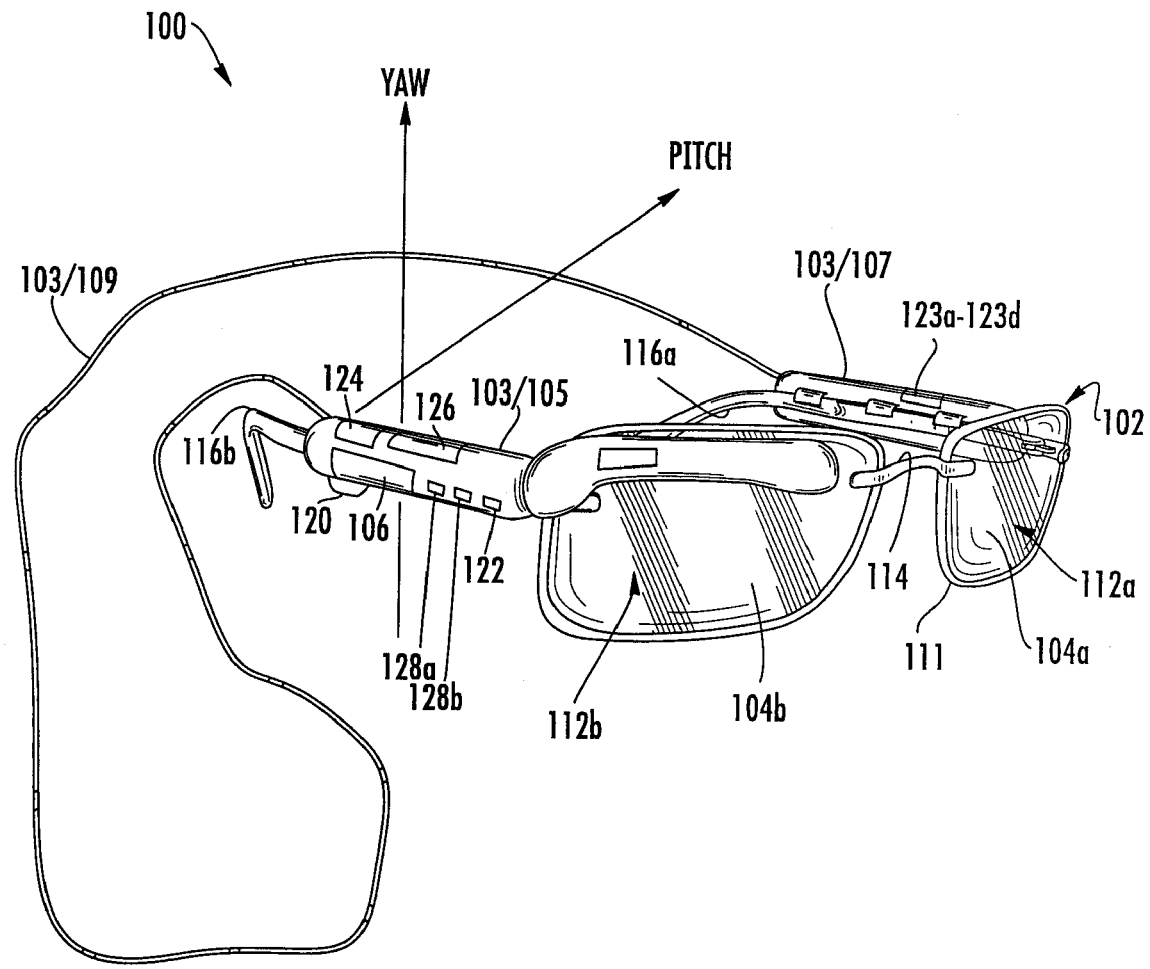
FIG. 1 is a perspective view drawing of an example wearable device in accordance with a preferred embodiment of the present invention.

Referring to FIG. 1, a perspective view drawing of an example wearable device (or system) 100 in accordance with a preferred embodiment of the present invention is shown. The device 100 may implement clip-on modules with an embedded human input/output (I/O) interface for use with eyeglasses. The device 100 generally comprises a frame (or eyeglasses) 102 and an apparatus 103. The apparatus 103 generally comprises a housing (or unit) 105, a housing (or unit) 107, a harness (or cable) 109 and a housing (or unit) 110.

The eyeglasses 102 may include a main body 111, a pair of lens openings 112a-112b for mounting lenses 104a-104b, a nose piece 114 and two temples 116a-116b. The lens openings 112a-112b may define an optical path for a user wearing the eyeglasses 102. In some embodiments, the lenses 104a-104b may be implemented as prescription lenses, non-prescription lenses, tinted lenses, safety lenses and/or the like. In other embodiments, the lenses 104a-104b may be absent from the lens openings 112a-112b.

The housing 105 may be implemented as an electronics housing. The housing 105 generally contains and/or supports a circuit (or module) 106, a speaker 120, a microphone 122, a haptic device 124, a bone conduction device 126 and two accelerometers 128a-128b. The housing 105 may be removably secured to a temple (e.g., the temple 116b) of the eyeglasses 102.

The housing 107 may be implemented as a battery housing. The housing 107 may contain and/or support a cavity 129 (see FIG. 2) and one or more switches 123a-123d. The cavity 129 may be implemented as a battery cavity. One or more batteries 108 (see FIG. 2) may be removably or permanently disposed within the cavity 129. The housing 107 may be removably secured to a temple (e.g., the temple 116a) of the eyeglasses 102.

The harness 109 may electrically connect and optionally electronically connect the circuitry of the housing 105 with the circuitry and battery 108 of the housing 107. The harness 109 generally attaches to a back end of the housing 107 and a back end of the housing 105. In some embodiments, the harness 109 may have a sufficient length to permit the harness 109 to act as a retention chord for the eyeglasses 102. Other lengths and/or routes between the housings 105 and 107 may be implemented to meet the criteria of a particular application.

The circuit 106 may be referred to as an electronics/radio frequency (RF) circuit. The electronics/RF circuit 106 may be operational to provide two-way radio communications with other devices external to and remote from the housing 105 and the device 100. For example the electronics/RF circuit 106 may receive a voice signal in a receive message from an external telephone (or other device) and provide commands back to the telephone (or other device) in a transmit message. The commands provided to the telephone may be generated in a hands-free manner (e.g., without a user pressing a button with his or her hands). The communications may be implemented per a wireless Bluetooth standard, a wireless Universal Serial Bus (USB) standard, a cellular telephone standard and/or a WiFi standard. Other standard and/or propriety protocols may be implemented to meet the criteria of a particular application.

The one or more batteries 108 (hereafter battery 108) may provide electrical power to the electronic, the opto-electronic components and, in particular, the electronics/RF circuit 106 and the housing 110. The battery 108 may be implemented as a rechargeable and/or replaceable battery. Other battery technologies may be implemented to meet the criteria of a particular application.

Figure 3:
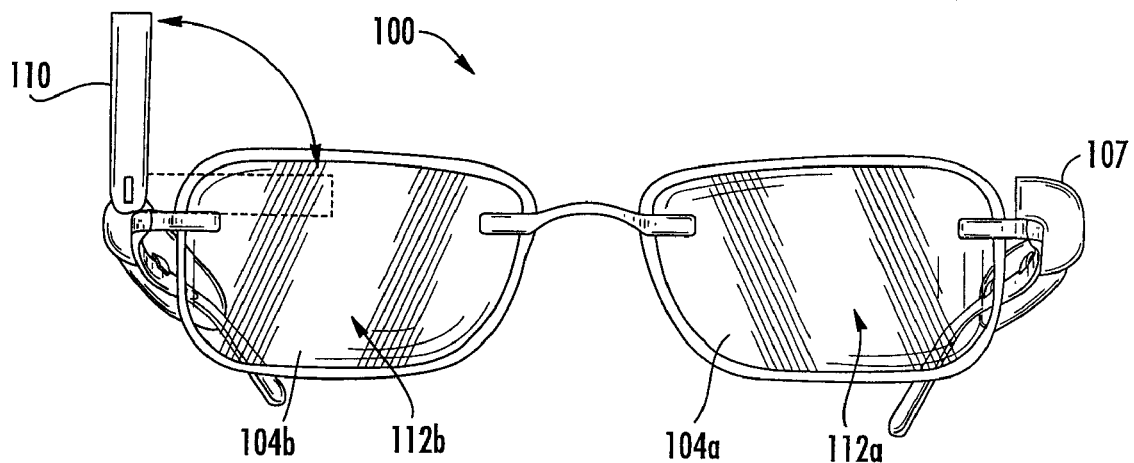
FIG. 3 is a front view drawing of the device.

The housing (or device) 110 may be implemented as a display device. The display device 110 may be pivotally or rigidly attached to the housing 105 at a forward end of the housing 105. In embodiments where the display device 110 is pivotally attached to the housing 105, an active position (as shown in FIG. 1) and a standby position (as shown in FIG. 3) may be defined. While in the active position, an active output generated by the display device 110 may be located before a lens opening (e.g., lens opening 112b) such that an image presented to the user is inside the optical path defined by the lense openings 112a-112b. The image may be placed in a periphery of a vision of a user. While in the standby position, the display device 110 may be located outside the optical path defined by the lens openings 112a-112b. In embodiments where the display device 110 is rigidly attached to the housing 105, the display device 110 may be in the active position. Other mounting arrangements may be implemented to meet the criteria of a particular application.

A design of the display device 110 may provide a short image distance yet retain an "infinite" focus. A lens/mirror system 131a-131b (see FIG. 2) may be included in an optical path of the display device 110 to shorten the optical path. A display element 133 within the display device 110 may be implemented as a liquid crystal display (LCD), organic LCD (OLCD), a light emitting diode (LED) or similar type of pixilated display. A passive ambient backlighting and/or an active backlighting scheme may be included within the display device 110 to provide good visibility ranging from very bright ambient conditions to low light conditions. An example ambient backlighting scheme is generally described in co-pending U.S. patent application Ser. No. 11/233,163, filed Sep. 22, 2005 which is hereby incorporated by reference in its entirety.

The speaker 120 may be mounted on the housing 105. Positioning of the speaker 120 may be such that a user wearing the device 100 may hear a sound generated by the speaker 120. The microphone 122 may be mounted on the housing 105, preferably toward a front end near a lens opening 112a and/or 112b. The microphone may be operational to convert sounds received from the user into an electrical signal presented to the electronics/RF circuit 106. Such responses may be generated in a hands-free manner.

The speaker 120 may be controlled by the electronics/RF circuit 106. In particular, the electronics/RF circuit 106 may send an electrical signal to the speaker 120 to create an audible sound. The audible sound may be a voice from a telephone and/or a tone generated internal to the electronics/RF circuit 106.

The microphone 122 may provide the user's voice to the electronics/RF circuit 106. The electronics/RF circuit 106 may process the voice data in different ways, depending on the application and/or current mode of operation. For example, when the microphone 122 is used for voice communications via a telephone, the electronics/RF circuit 106 may package and present the user voice data in a transmit message transmitted to an external telephone. In another example, the microphone 122 may be used to sample voice-based commands spoken by the user. As such, the electronics/RF circuit 106 may include a voice recognition capability (e.g., software and/or firmware). Based on the words detected, the electronics/RF circuit 106 may transmit one or more commands to external devices and/or change one or more settings in the device 100 (e.g., switch the artificial backlighting on/off in the display device 110).

The switches 123a-123d may be mounted to the housing 107 (as shown) or to the housing 105. The switches 123a-123d generally allow the user to control various functions and priorities of the device 100. For example, a first switch (e.g., 123a) may be configured to control on/off the electrical power to the electronics. Another switch (e.g., 123b) may be used to control on/off the operation of the accelerometers 128a-128b. Still another example switch 123 (e.g., 123c) may be used to control on/off the display device 110. Other user controlled features may be implemented to meet the criteria of a particular application.

The bone conduction device 124 may be mounted in the housing 105 (as shown) and/or in the housing 107. A shape and positioning of the bone conduction device 124 may be adapted to make physical contact with a bone (e.g., a skull) of the user when wearing the device 100. The bone conduction device 124 may be operational to transfer vibrations to the user through the user's bones. The vibrations may be in the form of a voice (or speech) that may be sensed audibly to the user, an incoming phone call ring vibration, a notification vibration, a warning vibration or the like. In some embodiments, the bone conduction device 124 may also operate as a microphone to detect the user's voice. The detected voice may be transferred to the electronics/RF circuit 106 for incorporation into a transmit message sent external to the device 100. When operating as a speaker, the bone conduction device 124 may be used in place of, or in addition to the speaker 120. When operating as a microphone, the bone conduction device 124 may be used in place of, or in addition to the microphone 122.

The haptic device 126 may be mounted in the housing 105 (as shown) or in the housing 107. The haptic device 126 may be operational to generate vibrations that may be felt by the user. The vibrations may indicate, but are not limited to, an incoming phone call (e.g., a ring vibration), an alert vibration, a notification vibration or the like. The haptic device 126 may be controlled by the electronics/RF circuit 106.

The accelerometers 128a-128b may be mounted in the housing 105 (as shown) and/or in the housing 107. A first accelerometer 128a may be oriented to sense a pitch movement of the eyeglasses 102 (e.g., a movement of the user's head) about a pitch (or horizontal) axis. The pitch axis may be defined from left to right through the eyeglasses 102. A second accelerometer 128b may be oriented to sense a yaw movement of the eyeglasses 102 (e.g., a movement of the user's head) about a yaw (or vertical) axis. The yaw axis may be defined as a vertical (relative to the ground) axis through the eyeglasses 102.

The accelerometers 128a-128b may be used by the electronics/RF circuit 106 to receive inputs from the user. For example, to answer a telephone call, the electronics/RF circuit 106 may send the telephone a command to answer the call in response to the accelerometers 128a-128b detecting a nodding "yes" (pitch) movement of the user's head. A shaking "no" (yaw) movement of the user's head may be cause the electronics/RF circuit 106 to generate a different command to the telephone not to answer the call.

Each of the accelerometers 128a-128b may be operational to sense and report a direction of acceleration. For example, the pitch accelerometer 128a may generate a positive value in response to a forward rotation (e.g., user's nose moving down) of the eyeglasses 102 about the pitch axis. A negative value may be generated in response to a backwards rotation (e.g., user's nose moving upwards) of the eyeglasses 102 about the pitch axis. Likewise, the yaw accelerometer 128b may generate a positive value for a clockwise rotation of the eyeglasses 102 (e.g., user's left ear forward, right ear backwards) about the yaw axis. A negative value may be generated for a counterclockwise rotation of the eyeglasses 102 (e.g., user's left ear backwards, right ear forward) about the yaw axis.

Figure 2:
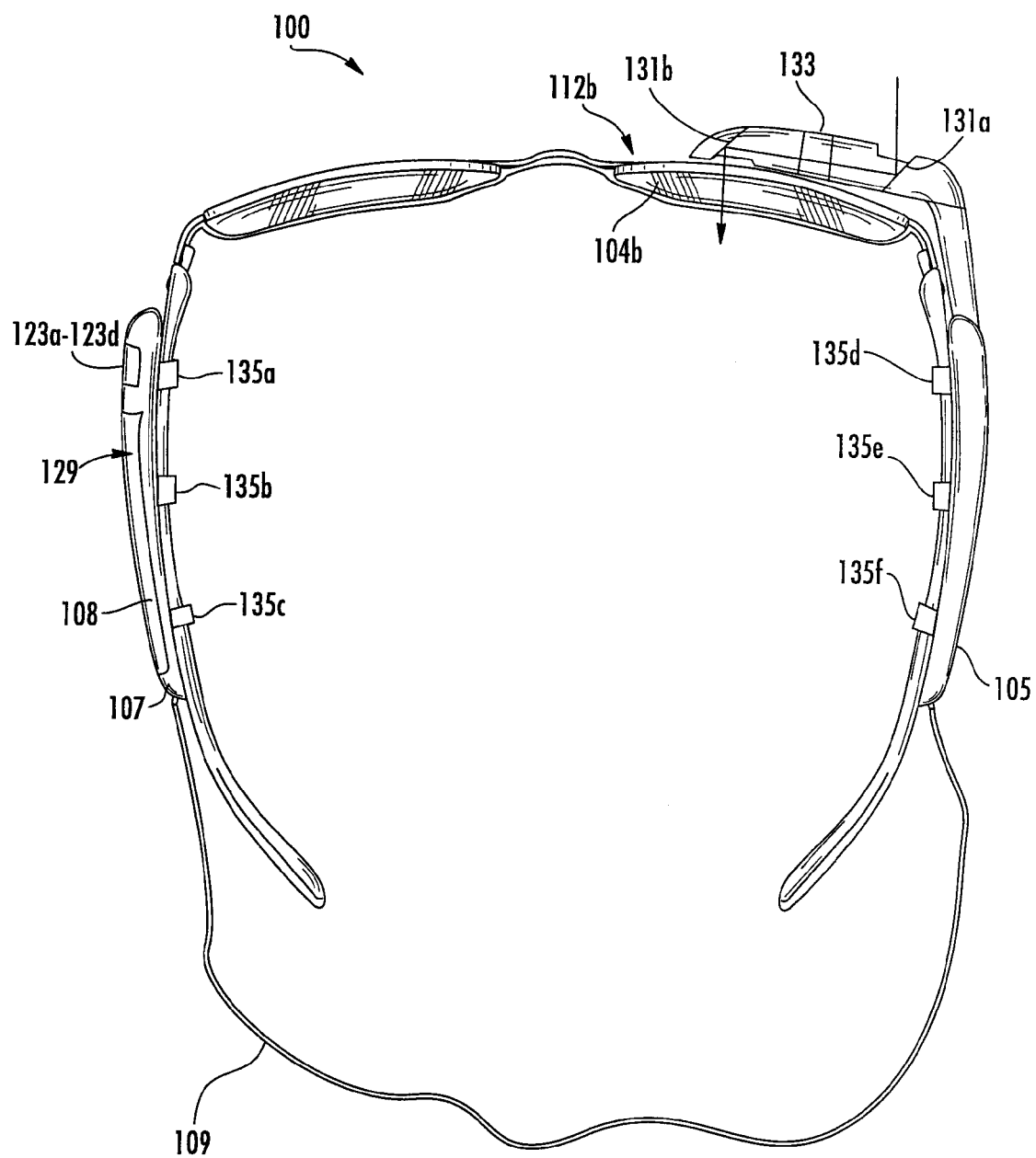
FIG. 2 is a top view drawing of the device.

Referring to FIG. 2, a top view drawing of the device 100 is shown. As discussed earlier, the housing 107 may include the cavity 129. The cavity 129 may hold the battery 108. Multiple clips (or fasteners) 135a-135f may be formed and/or attached to an exterior of the housing 105 and an exterior of the housing 107. The clips 135a-135f may be shaped to allow the housing 105 and the housing 107 to be removably secured to the temples 116a-116b. In some embodiments, a single clip (e.g., 135b and 135e) on each of the housings 105 and 107 may be sufficient to attach the housings 105 and 107 to the temples 116a-116b. In other embodiments, each housing 105 and 107 may include multiple clips 135a-135f for connecting to the temples 116a-116b. In still other embodiments, the clips 135a-135f may be implemented to form a permanent attachment between the housings 105 and 107 and the temples 116a-116b.

Referring to FIG. 3, a front view drawing of the device 100 is shown. In FIG. 3, the display device 110 is generally illustrated in the standby position where the display device 110 has been rotation upward approximately 90 degrees. While in the standby position, the display device 110 may not obstruct any portion of the user's field of view. In some embodiments, other non-active position or positions may be defined to meet the criteria of a particular application.

Figure 4:
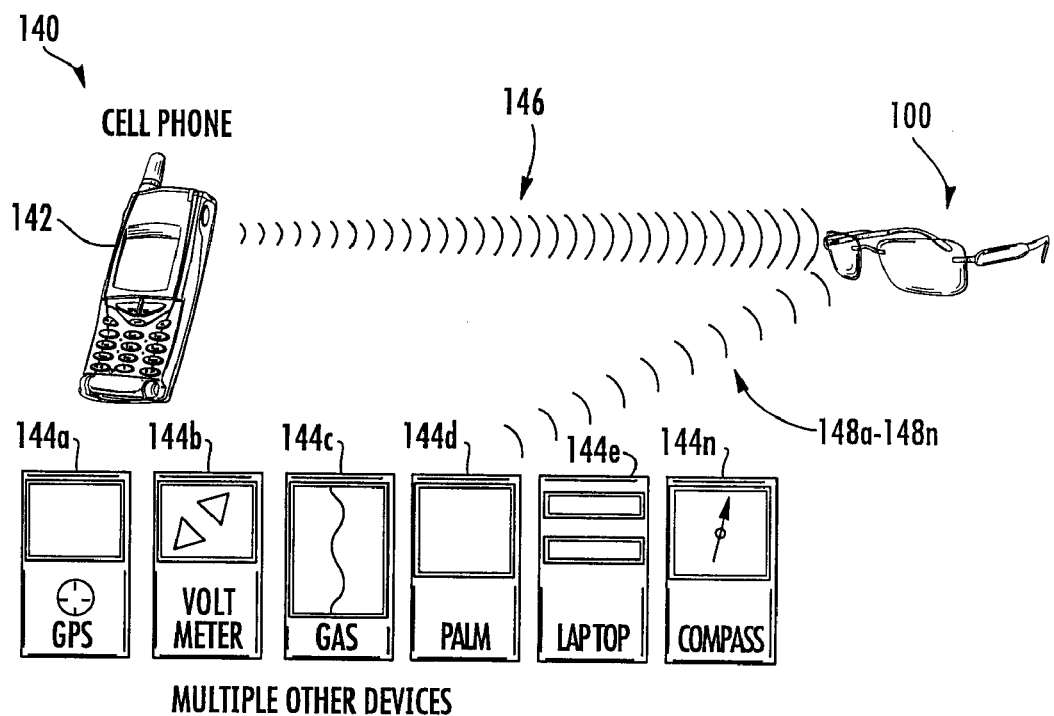
FIG. 4 is a diagram of a system incorporating the device.

Referring to FIG. 4, a diagram of a system 140 incorporating the device 100 is shown. The system 140 generally comprises the device 100, a telephone 142 and possibly one or more external devices 144a-144n. The external devices 144a-144n may include, but are not limited to a compass, a Global Positioning System (GPS) receiver, a gas detector (e.g., propane gas), a voltmeter, a PALM personal computer, a laptop computer, a speedometer, an odometer, an altimeter, a digital audio (e.g., MP3) player and the like. An RF communication link 146 may be established between the telephone 142 and the device 100. One or more RF communication links 148a-148n may be established between the device 100 and the respective external devices 144a-144n.

The communications link 146 may be a two-way link. For example, voice data, caller identification, instant messaging and/or text messaging may be transferred from the telephone 142 to the device 100 via one or more messages in the communication link 146. In turn, the device 100 may transmit voice data and commands (e.g., answer a call, end a call, etc.) via one or more messages transmitted in the communication link 146 to the telephone 142.

The other communication links 148a-148n may be any combination of one-way and/or two-way links. For example, a voltmeter type of external device (e.g., 144b) may transmit a voltage reading and an alert signal to the device 100 via a respective one-way communication link (e.g., 148b). The device 100 may not return any data or commands to the voltmeter. In another example, a GPS type of external device (e.g., 144a) may provide positioning and menu data to the device 100 via a respective two-way communication link (e.g., 148a). In reply, the device 100 may transmit menu and cursor commands from the user back to the GPS device. In still another example, the device 100 may send messages (e.g., lights on/off) to one or more of the external devices 144a-144n via other respective one-way communication links 148a-148n.

Figure 5:
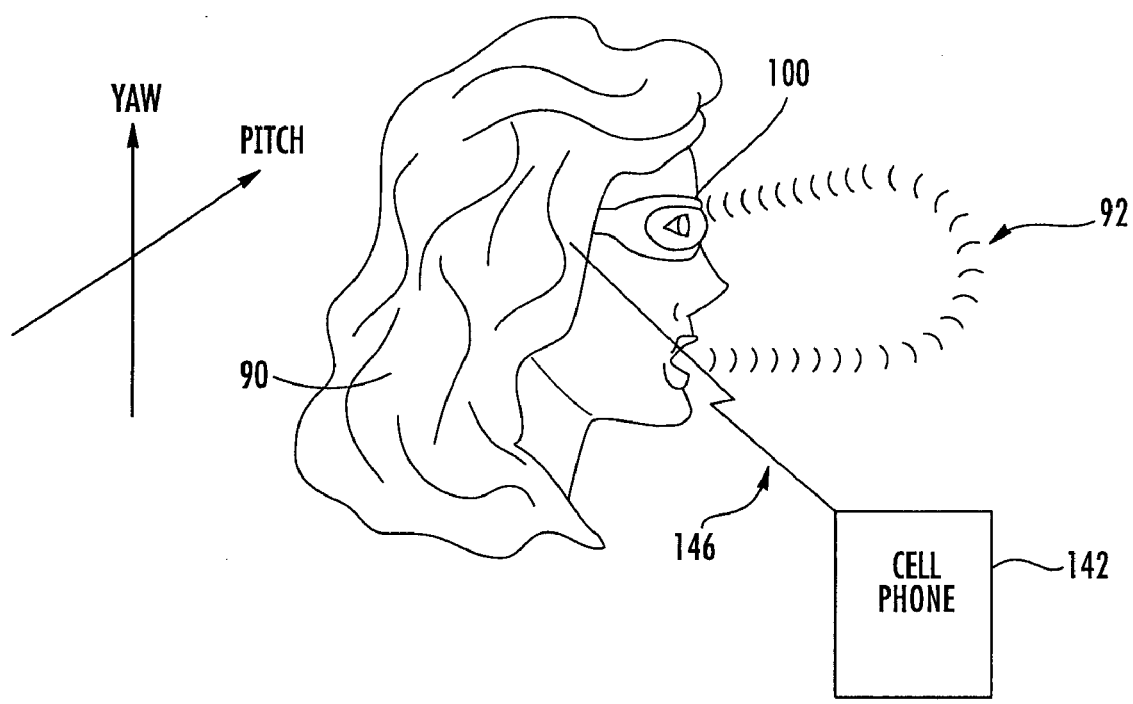
FIG. 5 is a diagram of a user wearing the device.

Referring to FIG. 5, a diagram of a user 90 wearing the device 100 is shown. The user 90 may speak creating sound waves 92 that are detectable by the microphone 122. The microphone 122 may convert the sound waves into an electrical signal presented to the electronics/RF circuit 106. The electronics/RF circuit 106 may format the electronic representations of the sound waves 92 and then transmit the data in a message via the communication link 146 to the telephone 142.

Figure 6:
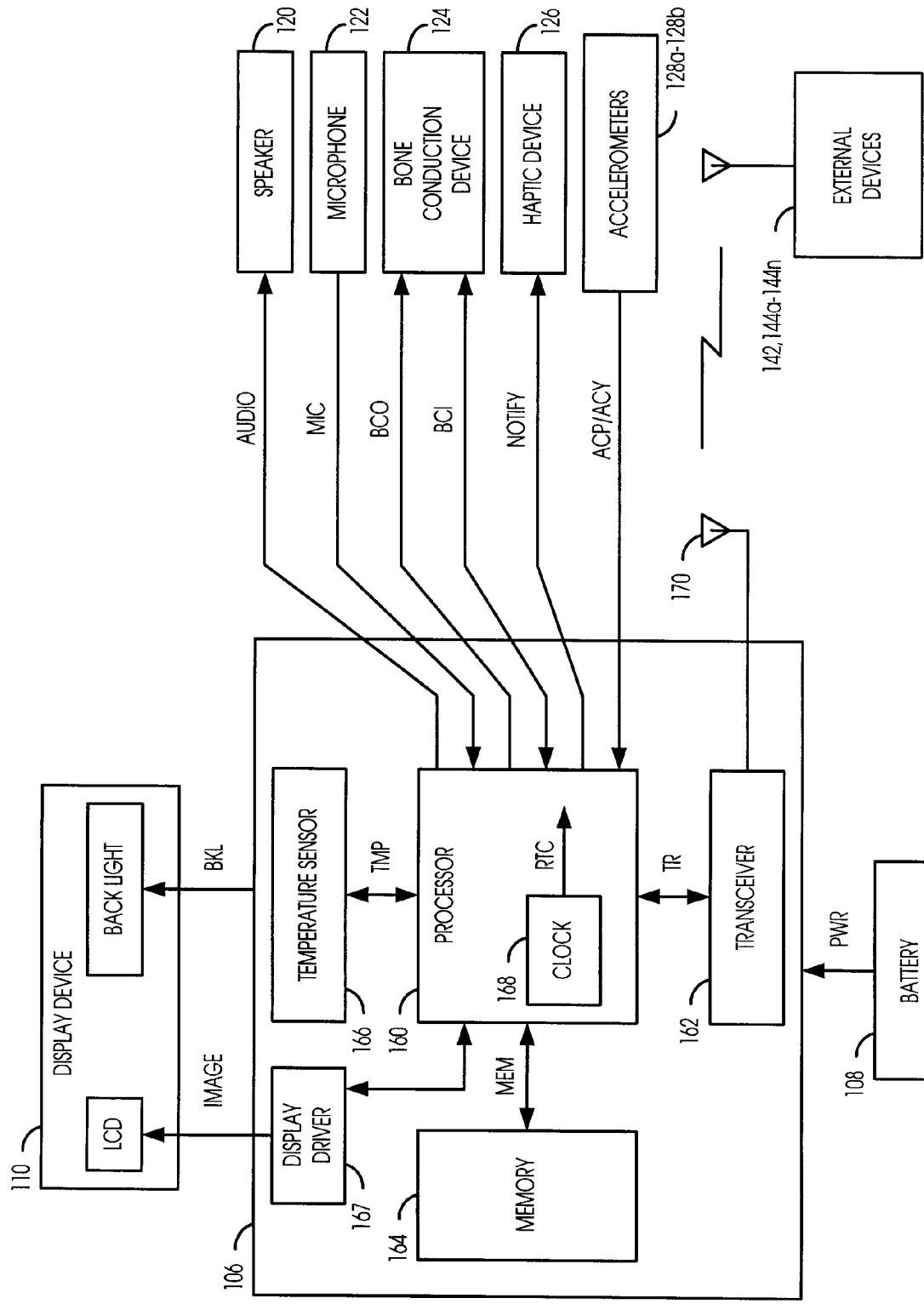
FIG. 6 is a block diagram of an example implementation of an electronics/radio frequency circuit.

Referring to FIG. 6, a block diagram of an example implementation of the electronics/RF circuit 106 is shown with the surrounding components. The electronics/RF circuit 106 generally comprises a processor (or microcontroller) 160, a transceiver 162, a memory circuit 164, a temperature sensor 166 and a display driver 167. The processor 160 may include a real time clock 168. An antenna 170 may be embedded in the housing 105 external to the electronics/RF circuit 106, formed as part of the harness 109 or the antenna 170 may be part of the electronics/RF circuit 106. In some embodiments, the display driver 167 may be part of the processor 160.

A power signal (e.g., PWR) may be received by the electronics/RF circuit 106 from the battery 108. A temperature signal (e.g., TMP) may be transferred from the temperature sensor 166 to the processor 160. The processor 160 may exchange data and instructions with the memory circuit 164 via a signal (e.g., MEM). A transmit/receive signal (e.g., TR) may exchange messages between the processor 160 and the transceiver 162. The transceiver 162 may exchange messages with the external devices 142 and/or 144a-144n via a radio frequence signal (e.g., RF) on the antenna 170. A real time clock signal (e.g., RTC) may be generated by the clock circuit 168 for use by the processor 160.

The display driver 167 may send an image signal (e.g., IMAGE) to the display device 110 for displaying to the user. The processor 160 may send a backlighting signal (e.g., BKL) to the display device 110 when ambient lighting conditions are low.

An audio signal (e.g., AUDIO) may be sent from the processor 160 to the speaker 120. A speech signal (e.g., MIC) may be received by the processor 160 from the microphone 122. The processor 160 may send a bone conduction output signal (e.g., BCO) to the bone conduction device 124 for transfer to the user. A bone conduction input signal (e.g., BCI) may be received by the processor 160 from the user via the bone conduction device 124. A notification signal (e.g., NOTIFY) may be presented from the processor 160 to the haptic device 126 for transfer to the user. Two acceleration signals (e.g., ACP and ACY) may be sent from the respective accelerometers 128a-128b to the processor 160.

Figure 7:
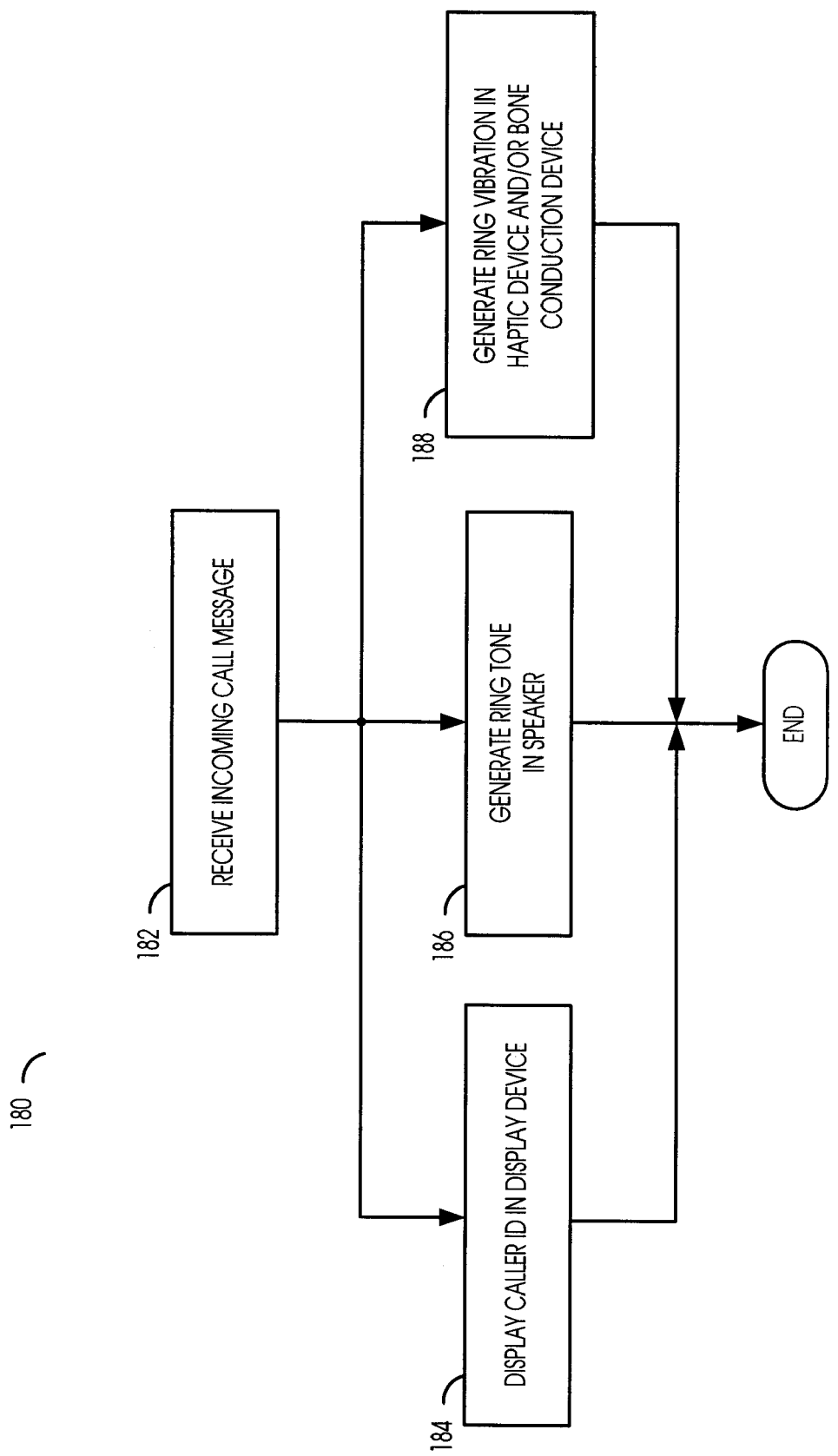
FIG. 7 is a flow diagram of an example method for processing a new telephone call.

Referring to FIG. 7, a flow diagram of an example method 180 for processing a new telephone call is shown. The call processing method (or process) 180 generally comprises a step (or block) 182, a step (or block) 184, a step (or block) 186 and a step (or block) 188. The method 180 generally starts in the step 182 with the electronics/RF circuit 106 receiving an incoming message indicating that a new telephone call has been received by the telephone 142. If the incoming message includes a caller identification (ID), the electronics/RF circuit 106 may generate an alphanumeric image of the caller ID in the signal IMAGE for display to the user via the display device 110 in the step 184. If the device 100 includes the speaker 120, the electronics/RF circuit 106 may generate a ring tone in the signal AUDIO in the step 186 to get the user's attention. If the device 100 include the haptic device 126 and/or the bone conduction device 124, the electronics/RF circuit 106 may generate a ring tone in the signal NOTIFY and/or BCO in the step 188 to alert the user to the incoming call. The steps 184, 186 and/or 188 may be performed substantially simultaneously (as shown) or in any appropriate sequence.

Figure 8:
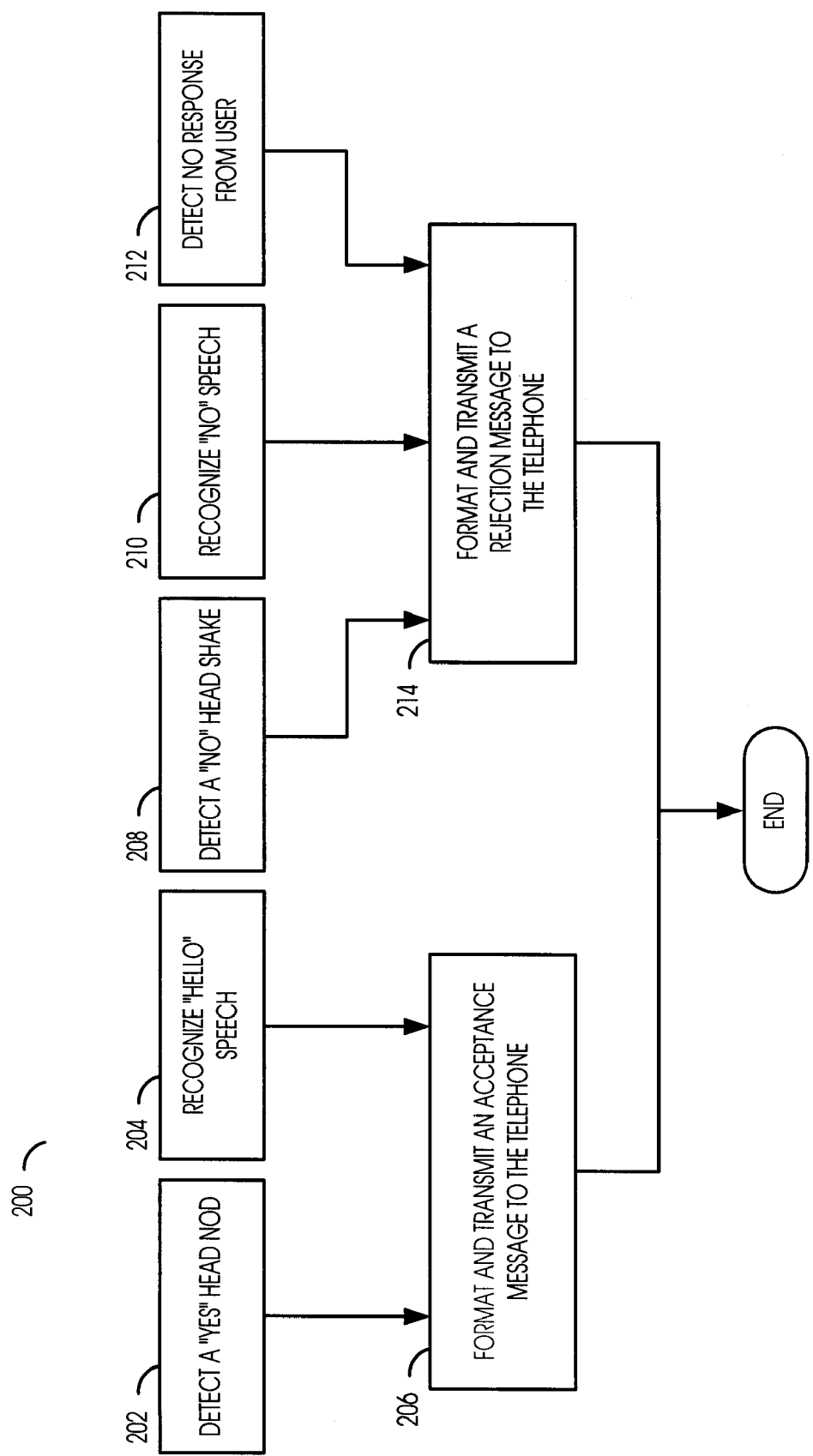
FIG. 8 is a flow diagram of an example method for processing a user response to the incoming telephone call.

Referring to FIG. 8, a flow diagram of an example method 200 for processing a user response to the incoming telephone call is shown. The response method (or process) 200 generally comprises a step (or block) 202, a step (or block) 204, a step (or block) 206, a step (or block) 208, a step (or block) 210, a step (or block) 212 and a step (or block) 214.

In the step 202, the user may decide to accept the call by nodding his head "yes" (e.g., pitch axis movement). The acceptance may be detected by the pitch accelerometer 128a generating the signal ACP in response to the movement. The processor 160 may recognize the movement in the signal ACP within a finite window of time after receiving the incoming call message (e.g., the step 182). The processor 160 may also detect that the user wants to accept the call in the step 204 by receiving an acceptance type speech (e.g., "Hello" in the signal MIC and/or the signal BCI). Upon determining to answer the call, the processor 160 may generate and format an acceptance message that is transmitted to the telephone 142 by the transceiver 162 in the step 206.

In the step 208, the user may affirmatively reject the incoming call. The rejection may be indicated by shaking "no" with his head. The shaking may be sensed by the yaw accelerometer 128b and relayed to the processor 160. The processor 160 may conclude that the movement in the signal ACY may indicate that the incoming call has been rejected. The processor 160 may also detect a rejection of the call by receiving a rejection type speech (e.g., "No" in the signal MIC and/or the signal BCI) from the user in the step 210. A priority scheme may be implemented to account for conflicting commands.

Another way for the user to reject the call is to do and say nothing. In the step 212, the processor 160 may detect the absence of an appreciable movement in the acceleration signals ACP and ACY and the lack of an appreciable sound in the signals MIC and BCI for a predetermined period after receiving the incoming call message. When the processor 160 concludes that the call should be rejected, the processor 160 may generate and format a rejection command in an outgoing message to the telephone in the step 214.

Figure 9:
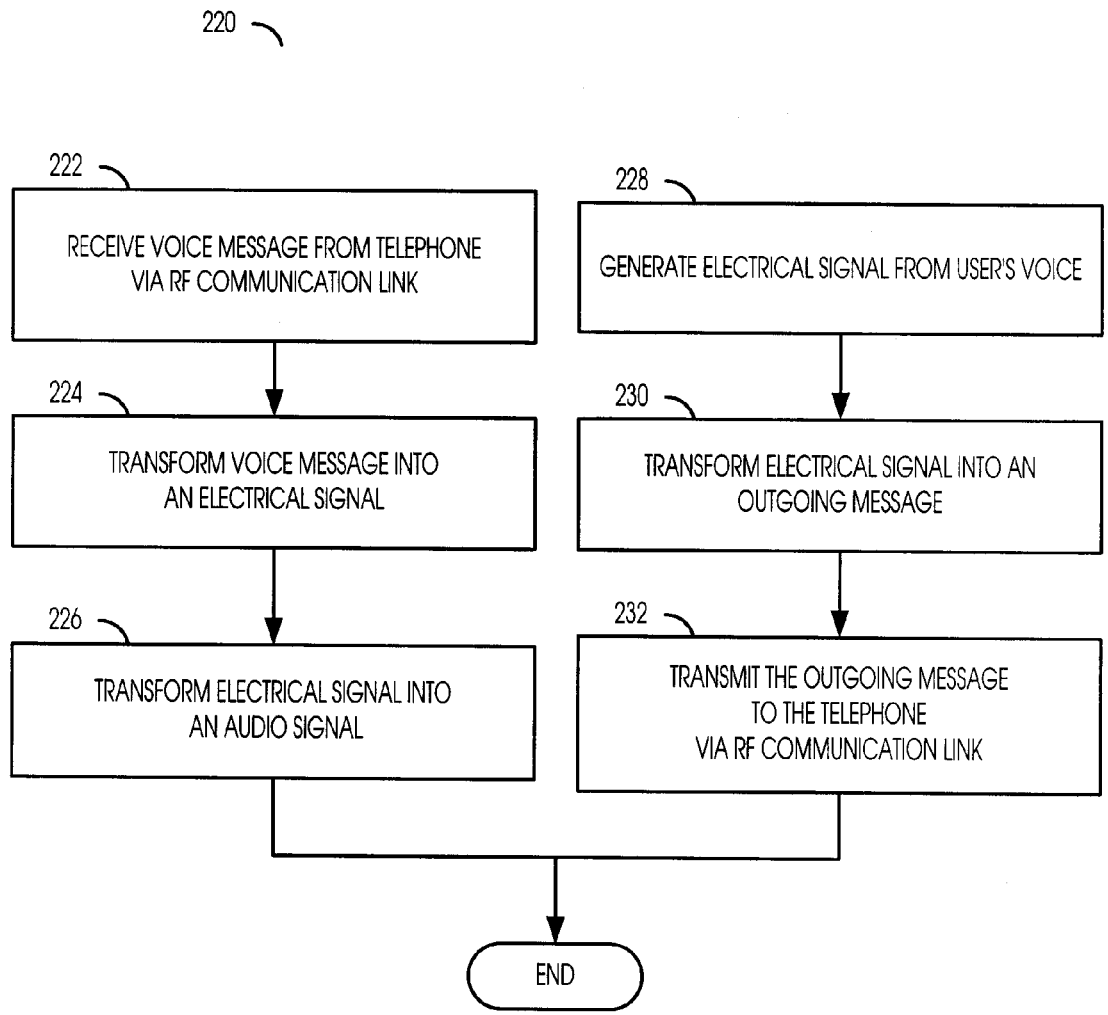
FIG. 9 is a flow diagram of an example method for conducting a telephone conversation.

Referring to FIG. 9, a flow diagram of an example method 220 for conducting a telephone conversation is shown. The conversation method (or process) 220 generally comprises a step (or block) 222, a step (or block) 224, a step (or block) 226, a step (or block) 228, a step (or block) 230 and a step (or block) 232. In the step 222, the transceiver 162 may receive a voice signal from the telephone 142 in a receive message via the RF communication link 146. The processor 160 may translate the voice signal into an appropriate format and amplitude for the signal AUDIO and/or the signal BCO in the step 224. The speaker 120 and/or the bone conduction device 124 may transfer the telephone voice in the signals AUDIO and BCO respectively to the user in the step 226.

In the step 228, the microphone 122 and/or the bone conduction device 124 may detect the user's voice and generate the respective signals MIC and BCI. The processor 160 may transform the user's voice into an appropriate format for transmission to the telephone 142 in the step 230. The transceiver 162 may send the formatted voice of the user in a transmit message via the RF communication link 136 to the telephone 142 in the step 232.

Figure 10:
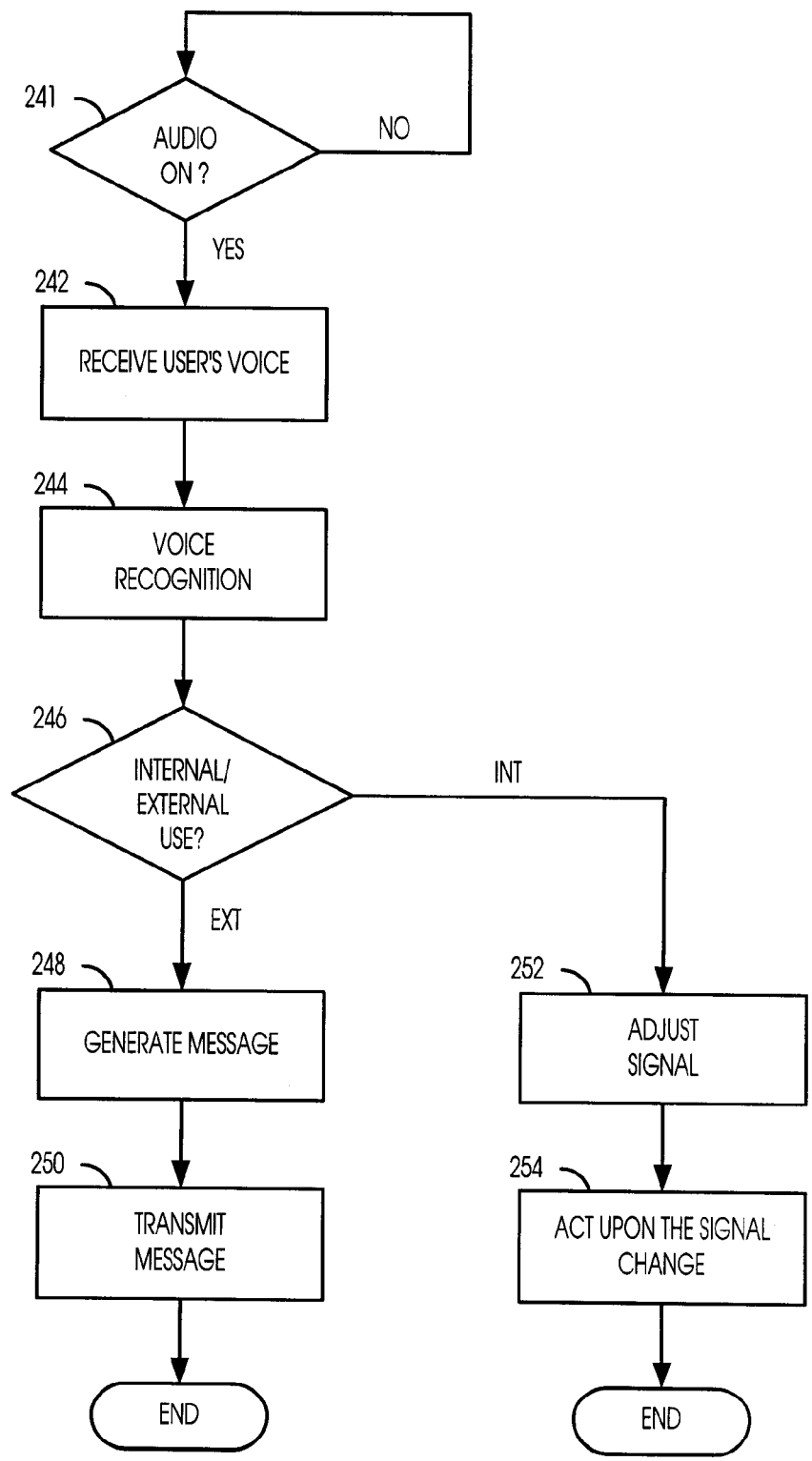
FIG. 10 is a flow diagram of an example method for responding to a user voice.

Referring to FIG. 10, a flow diagram of an example method 240 for responding to a user voice is shown. The voice response method (or process) 240 generally comprises a step (or block) 241, a step (or block) 242, a step (or block) 244, a step (or block) 246, a step (or block) 248, a step (or block) 250, a step (or block) 252 and a step (or block) 254. The voice response method 240 may be implemented in the electronics/RF circuit 106.

In the method 240, the processor 160 may receive an audio signal (e.g., MIC or BCI) from the microphone 122 and/or the bone conduction device 124. If an audio reception capability is enabled (e.g., the YES branch of step 241), the method 240 may proceed to the step 242. If the audio reception capability is disabled (e.g., the NO branch of the step 241), the method 240 may ignore all audio signals received from the microphone 122 and/or the bone conduction device 124.

The processor 160 may perform a voice recognition on the speech within the audio signal in the step 244 to determine a voice response/command. A decision may be made in the step 246 to determine if the recognized speech is destined for (i) transmission to one of the external devices 142 and/or 144a-144n or (ii) a local component.

If the recognized speech is to be transmitted (e.g., the EXT branch of step 246), the processor 160 may generate an appropriate message in the step 248. The transceiver 162 may then transmit the message to the corresponding external device 142 or 144a-144n in the step 250. For example, if the recognized speech is "Hello" within a fixed time after recognizing an incoming telephone call, the processor 160 may generate a command message intended for the telephone 142 to pick up the incoming call.

If the recognized speech is to be used locally (e.g., the INT branch of step 246), the processor 160 may adjust an appropriate signal to the targeted component in the step 252. The targeted component may response to the signal in the step 254. For example, if the recognized speech is "backlight", the processor 160 may toggle the signal BKL to the display device 110 (e.g., on to off or off to on). A back lighting source in the display device 110 may respond to the signal BLK by illuminating or extinguishing, as commanded.

Figure 11:
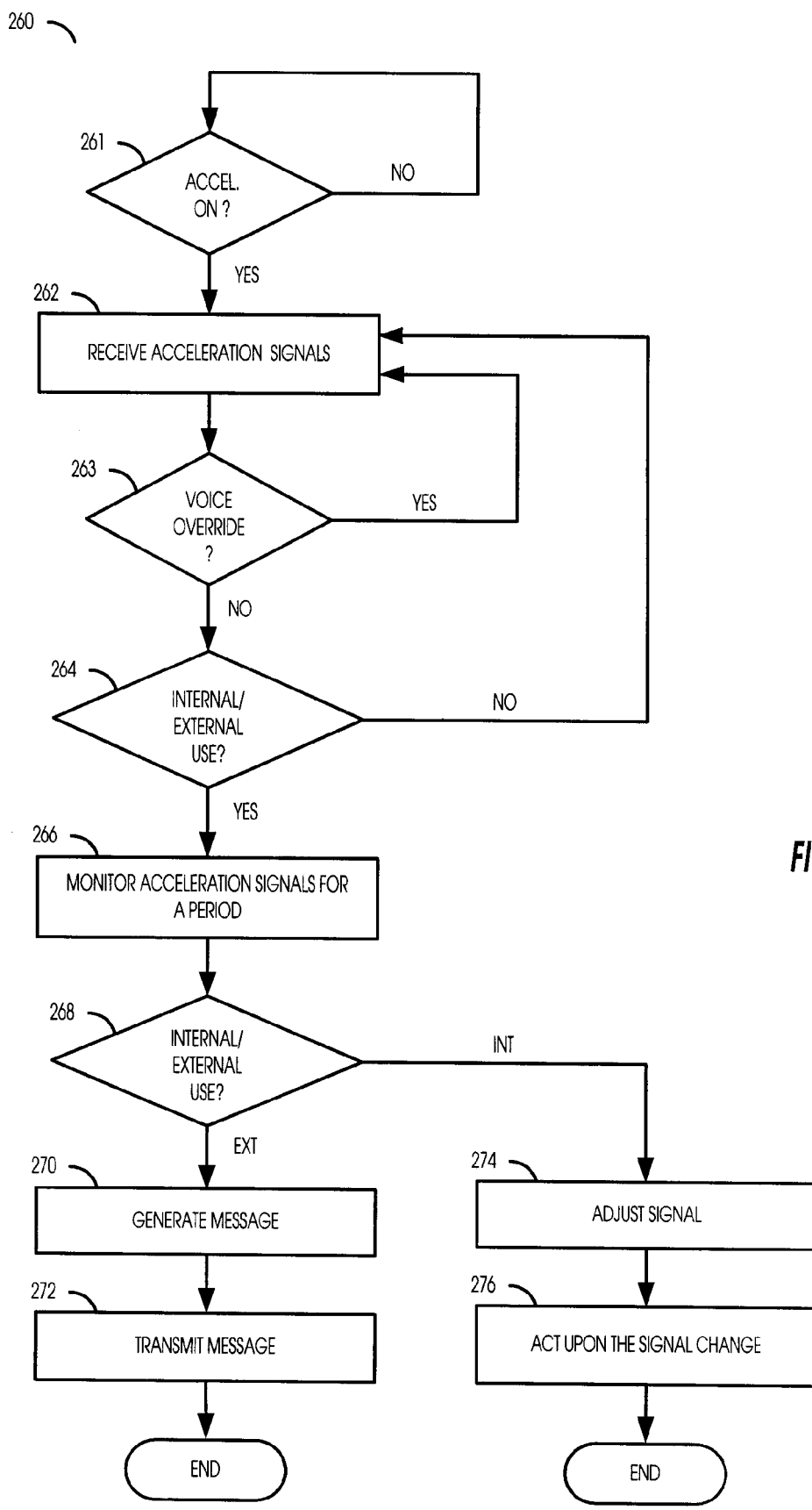
FIG. 11 is a flow diagram of an example method for responding to a user head movement.

Referring to FIG. 11, a flow diagram of an example method 260 for responding to a user head movement is shown. The movement response method (or process) 260 generally comprises a step (or block) 261, a step (or block) 262, a step (or block) 263, a step (or block) 264, a step (or block) 266, a step (or block) 268, a step (or block) 270, a step (or block) 272, a step (or block) 274 and a step (or block) 276. The movement response method 260 may be implemented primarily in the electronics/RF circuit 106.

If the accelerometers 128a-128b are on (e.g., the YES branch of step 261), the method 260 may continue with the step 262. If the accelerometers 128a-128b are off (e.g., the NO branch of step 261), the method 260 may exclude the signals ACP and ACY.

In the step 262, the processor 160 may receive the acceleration signals ACP and ACY from the accelerometers 128a-128b. In the step 263, the processor 160 may check for an overriding voice command. If a voice command has been received by the processor 160 and the voice command is different than the command sensed from the accelerometers 128a-128b, the processor 160 may give precedence to the voice command and override the accelerometer command (e.g., the YES branch of step 263). If the voice command agrees with the accelerometer command or no voice command is received within a reasonable period around reception of the acceleration command, the processor 160 may continue to process the acceleration command (e.g., the NO branch of step 263).

The amplitude of the accelerations may be checked in the step 264 against a minimal threshold to distinguish background movement from an intentional user command. If both accelerations are below the minimal threshold (e.g., the NO branch of step 264), the processor 160 may resample the signals ACP and ACY (e.g., step 252) at a later time. If one or both of the accelerations are above the minimal threshold (e.g., the YES branch of step 264), the processor 160 may monitor the acceleration signals ACP and ACY for a short period (e.g., 2 to 3 second) to determine the how the user is moving his head (e.g., up only, down only, nodding, left only, right only and/or shaking) in the step 266.

Once the movement is known, the processor 160 may check a current mode of operation and any recently received messages to determine if the command is intended as a response to an external stimuli or a command for an internal component in the step 268. If the command is for an external device (e.g., the EXT branch of step 268), the processor 160 may generate and format a command message corresponding to the accelerations detected in the step 270. The transceiver 162 may then transmit the command message to the appropriate external device in the step 272. For example, an up only acceleration during a GPS mode may be interpreted as a command to move a cursor on a GPS type of external device (e.g., 144a) up a single position. A down only acceleration may be interpreted as a command to move the cursor down. A left only motion may be interpreted as a command to move up one level in the GPS menu and a right only command may result in a command to the GPS device to select the option currently pointed to by the cursor or vice-versa.

If the command is for an internal device (e.g., the INT branch of step 268), the processor 160 may adjust one or more corresponding internal signals in the step 274 based on the detected command. The components receiving the adjusted signals may respond according to the adjustments in the step 276. For example, a down only acceleration during a control mode may be interpreted as an instruction to change the current mode to a previous mode (e.g., a speedometer mode to a compass mode) and an up only acceleration may result in a change from the current mode to a next mode (e.g., the speedometer mode to a temperature mode) or vice-versa.

Figure 12:
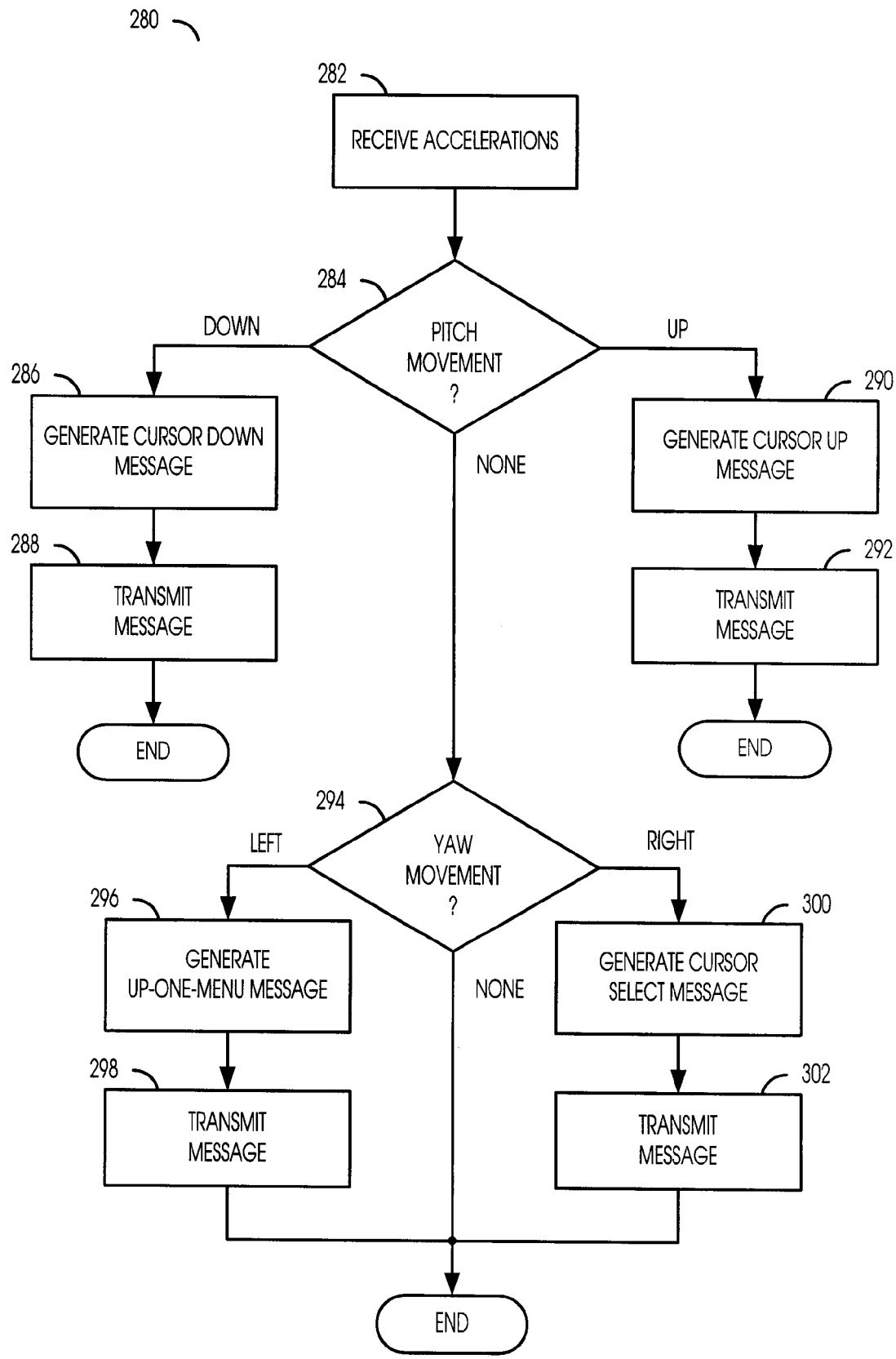
FIG. 12 is a flow diagram of an example method for controlling a menu-driven device.

Referring to FIG. 12, a flow diagram of an example method 280 for controlling a menu-driven device is shown. The menu method (or process) 280 generally comprises a step (or block) 282, a step (or block) 284, a step (or block) 286, a step (or block) 288, a step (or block) 290, a step (or block) 292, a step (or block) 294, a step (or block) 296, a step (or block) 298, a step (or block) 300 and a step (or block) 302. Examples of menu-driven type external devices generally include, but are not limited to, the GPS receiver, the PALM personal computer, the laptop computer and the digital audio player.

In the step 282, the processor 160 may receive the acceleration signals ACP and ACY from the accelerometers 128a-128b. The processor 160 may check for a pitch motion in the step 284. If movement down is detected (e.g., the DOWN branch of step 284), the processor 160 may generate a cursor down command in the step 286. In the step 288, the transceiver 162 may transmit the cursor down command to a particular external device 144a-144n (e.g., the GPS device 144a). The external device 144a-144n should respond to the cursor down command by moving the cursor down a position in a current menu from a current cursor location. If movement up is detected (e.g., the UP branch of step 284), the processor 160 may generate a cursor up command in the step 290. The in the step 292, the transceiver 162 may transmit the cursor up command to the external device 144a-144n. The external device 144a-144n should respond to the cursor up command by moving the cursor up a position in the current menu from the current cursor location.

If no pitch motion was detected or the pitch movement is in conflict with a voice command (e.g., the NONE) branch of step 284), the processor 160 may check for yaw movement in the step 294. If movement left is detected (e.g., the LEFT branch of step 294), the processor 160 may generate an up-one-menu command in the step 296. In the step 298, the transceiver 162 may transmit the up-one-menu command to the external device 144a-144n. The external device 144a-144n should respond to the up-one-menu command by changing the current menu to a new menu higher in a menu structure. If movement right is detected (e.g., the RIGHT branch of step 294), the processor 160 may generate a select command in the step 300. The in the step 302, the transceiver 162 may transmit the select command to the external device 144a-144n. The external device 144a-144n should respond to the select command by asserting a function at the current cursor location. The function may include, but is not limited to, moving down a level in the menu structure, activating a signal, deactivating a signal, toggling a mode or state, powering off and so on.

In some embodiments, the sensed movements in the various directions may be given different meanings. For example, the up-one-menu command may be generated in response to a right movement while the select command may be generated in response to a left movement. If no yaw motion was detected or the yaw movement is in conflict with a voice command (e.g., the NONE) branch of step 294), the processor 160 may conclude that no input from the user is available at the present time. In some embodiments, the processor 160 may check for yaw motion first and then pitch motion.

Figure 13:
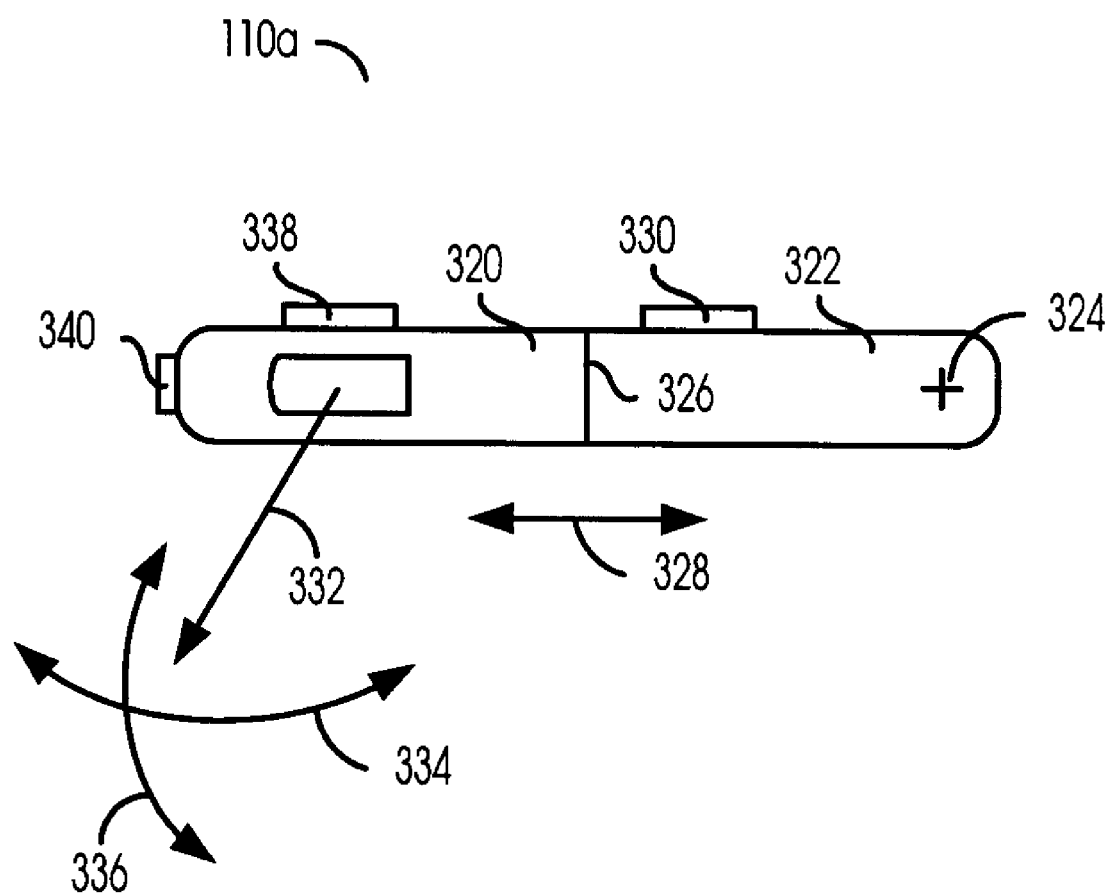
FIG. 13 is a diagram of an example adjustable display device.

Referring to FIG. 13, a diagram of an example adjustable display device (or housing) 110a is shown. Housing 110a may be similar to the housing 110 and optionally used in place of the housing 110. The housing 110a generally comprises a first portion (or unit) 320 and a second portion (or unit) 322. The portion 322 may be pivotally attached to the housing 105 about an axis 324 (e.g., a roll axis). The portion 320 may be slidably coupled to the portion 322 along a joint 326.

The joint 326 generally allows the portion 320 to move linearly with respect to the portion 322 towards and away from the axis 324, as indicated by arrow 328. The movement 328 generally allows the user to position of the image generated by the display element 133 horizontally along the top of the lens (e.g., 104b) at a desired location within the field of view. A control 330 may be included to lock/release the portions 320 relative to the portion 322. For example, the user may press the control 330 to release the portion 320, move the portion 320 to an intended position, then release the control 330 to lock the portion 320 in place. Vertical movement of the image within the field of view may be achieved by rotating the housing 110/110a about the axis 324.

One or more mirrors (e.g., 131b shown in FIG. 2) within the housing 110a and/or the portion 320 may be adjustable to move a projected direction 332 of the image about the yaw axis (as indicated by the arrow 334) and/or the pitch axis (as indicated by the arrow 336.) User adjustment of the mirrors/portion may be achieved through a control 338 (e.g., yaw) and a control 340 (e.g., pitch). The pitch movement and the yaw movement generally enable the user to direct the projected direction 332 of the image directly toward (e.g., on axis) or near (e.g., off axis) the user's eye. A brightness of the image may be maximized where the image is angled straight toward the user's eye. Directing the image off-axis may cause the image to appear dimmer to the user.

The functions performed by the diagrams of FIGS. 4-12 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMS, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
a first housing having (i) one or more first clips configured to removably secure said first housing to a frame of eyeglasses, (ii) at least one sensor configured to sense a response of a user wearing said eyeglasses and (iii) a transceiver configured to (a) receive an image in a receive message from a device external to said apparatus and (b) transmit said response in a transmit message to said device, wherein said response comprises a hands free response generated and transmitted in a hands free configuration in response to a movement of a head of said user; and
a second housing (i) attached to said first housing, (ii) positionable before a lens opening of said eyeglasses and (iii) configured to display said image to said user through said lens opening.

2. The apparatus according to claim 1, wherein said transceiver is further configured to receive an audio signal external from said apparatus and said apparatus further comprises a speaker mounted to said first housing and configured to convert said audio signal into a sound audible to said user.

3. The apparatus according to claim 1, wherein said at least one sensor comprises a microphone and said response comprises a sound receivable from said user.

4. The apparatus according to claim 1, further comprising (i) a display disposed within said second housing and configured to generate said image and (ii) a pair of mirrors disposed within said second housing and bracketing said display.

5. The apparatus according to claim 4, further comprising a backlight source disposed within said second housing and configured to illuminate said display.

6. The apparatus according to claim 1, wherein said image is displayed in a periphery of vision of said user.

7. The apparatus according to claim 1, further comprising a third housing having (i) one or more second clips configured to removably secure said third housing to said frame and (ii) a cavity configured to house a battery.

8. The apparatus according to claim 7, further comprising a harness electrically coupling said battery to a circuit within said first housing.

9. The apparatus according to claim 8, wherein said harness has a length sufficient to wrap behind a head of said user to serve as a retention chord for said eyeglasses.

10. The apparatus according to claim 1, wherein said first clips are configured to removably secure said first housing to a temple of said frame.

11. The apparatus according to claim 1, wherein said second housing is pivotally attached to said first housing to rotate away from said lens opening.

12. The apparatus according to claim 1, wherein said second housing is rigidly attached to said first housing.

13. The apparatus according to claim 1, wherein said second housing is further configured to adjust a projected direction of said image about a pitch axis.

14. The apparatus according to claim 1, wherein said second housing is further configured to adjust a projected direction of said image about a yaw axis.

15. The apparatus according to claim 1, wherein said second housing is further configured to adjust a horizontal position of said image along a pitch axis.

16. A method for interfacing with a user, comprising the steps of:
(A) removably securing a housing to a frame of eyeglasses;
(B) receiving an image in a first receive message from a device external to said housing;
(C) displaying said image to said user through a lens opening of said eyeglasses;
(D) sensing a response from said user; and
(E) transmitting said response in a transmit message to said device, wherein said response is generated and transmitted in a hands free configuration in response to a movement of a head of said user.

17. The method according to claim 16, wherein said image is related to an incoming call received by a telephone.

18. The method according to claim 17, further comprising the step of:
receiving a ring command in a second receive message from said telephone.

19. The method according to claim 18, further comprising the step of:
generating a sound audible to said user in response to said ring command.

20. The method according to claim 16, wherein detecting said response comprises detecting one of (i) a first audible phrase and (ii) a second audible phrase.

21. The method according to claim 16, wherein said image is for at least one of (i) a caller identification, (ii) an instant message, (iii) a global positioning system heading, (iv) a temperature, (v) a time, (vi) a gas detection notification, (vii) a compass heading, (viii) a PALM personal computer, (ix) a laptop computer, (x) a speedometer, (xi) an odometer, (xii) an altimeter and (xiii) an audio player menu.

22. An apparatus comprising:
- means for removably securing a housing to a frame of eyeglasses;
- means for receiving an image in a receive message from a device external to said housing;
- means for displaying said image to a user through a lens opening of said eyeglasses;
- means for sensing a response from said user; and
- means for transmitting said response in a transmit message to said device, wherein said response is generated and transmitted in a hands free configuration in response to a movement of a head of said user.

* * * * *